H. B. LESTER.
COASTER BRAKE.
APPLICATION FILED FEB. 28, 1911.

993,385.

Patented May 30, 1911.

Witnesses:
Josephine H. Strempfer
Arthur B. Jenkins.

Inventor:
Harry B. Lester by
Harry P. Williams
atty

UNITED STATES PATENT OFFICE.

HARRY B. LESTER, OF DAYTON, OHIO, ASSIGNOR TO THE DAVIS SEWING MACHINE COMPANY, OF DAYTON, OHIO, A CORPORATION OF OHIO.

COASTER-BRAKE.

993,385.  Specification of Letters Patent.  Patented May 30, 1911.

Application filed February 28, 1911. Serial No. 611,520.

*To all whom it may concern:*

Be it known that I, HARRY B. LESTER, a citizen of the United States, residing at Dayton, in the county of Montgomery and State of Ohio, have invented a new and useful Improvement in Coaster-Brakes, of which the following is a specification.

This invention relates to those rear-wheel driving-hubs of bicycles, which are provided with a clutch part that is moved outwardly by a screw for making a driving connection between the sprocket and the hub, when the sprocket is turned forwardly, and that is moved inwardly by the screw for releasing the driving connection and permitting the wheel to run free when the sprocket is held, and when the sprocket is given a backward turn, is moved still farther inwardly so as to cause the hub to be clutched with a fixed part for braking.

The object of this invention is to provide a small, and self-contained rear wheel coaster brake hub of this nature which has few parts, whereby it is cheap to make and easy to assemble, and which parts are so designed and arranged that the action will be sure and satisfactory, without undue strain and wear.

Figure 1:
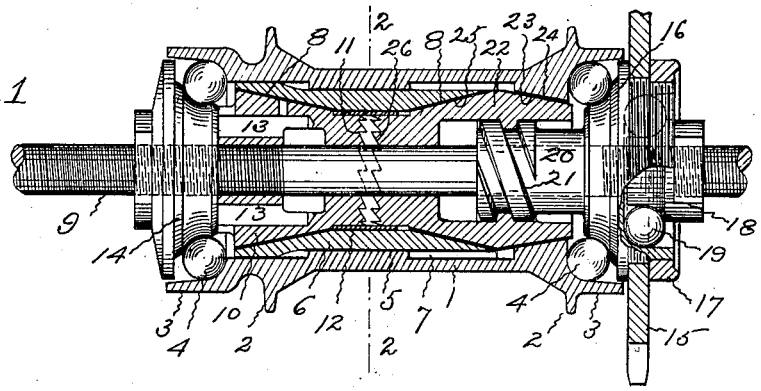
Figure 2:
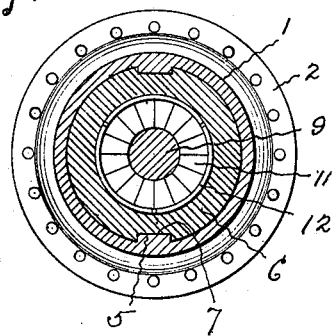
Figure 3:
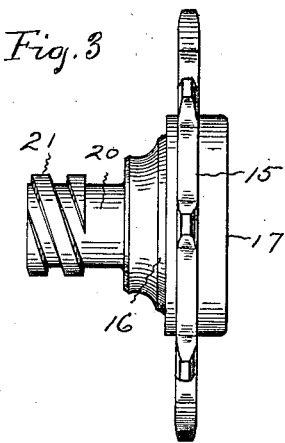
Figure 4:
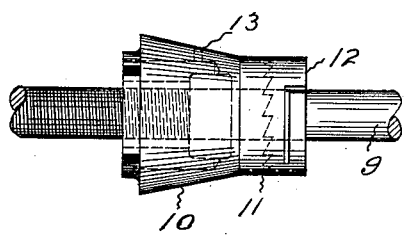
Figure 5:
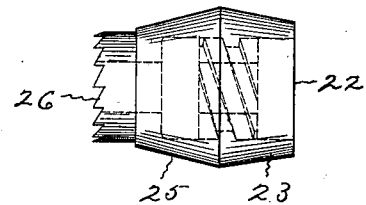

Figure 1 of the accompanying drawings shows a central longitudinal section of the hub and the driving and braking clutch parts. Fig. 2 shows a transverse section across the middle of the hub on the plane indicated by the dotted line 2—2 on Fig. 1. Fig. 3 shows a side view of the sprocket wheel and its hub which is provided with the clutch actuating screw. Fig. 4 shows a side view of the fixed member of the braking clutch. Fig. 5 shows a side view of the member of the clutch that is moved outwardly by the screw for making the driving connection between the sprocket and the hub, and is moved inwardly for causing the braking connection to be made between the hub and the fixed clutch member.

The cylindrical hub 1 has the usual perforated flanges 2 for the attachment of the spokes, and ball cups 3 at its ends for holding the bearing balls 4. In the interior, and extending inwardly from desirably diametrically opposite sides of the inner wall of the hub, to which they are fixed, are ribs 5, that are designed to act as splines.

Loosely fitting in the hub is a sleeve 6. This sleeve has in its outer surface grooves 7 which receive the ribs or splines 5 so that while the sleeve is free to move longitudinally back and forth in the hub, it is rotarily connected therewith. The inner walls of the sleeve at the opposite ends are tapered outwardly so as to form conical female clutch surfaces 8.

Threaded on one end of the axle 9 is the fixed brake cone 10. The tapering surface of this cone loosely fits the tapering inner clutch wall of the longitudinally movable sleeve 6. It is desirable to form ratchet teeth 11 on the inner end of the fixed cone, and to place about this end a thin spring friction ring 12. Oil or grease passages 13 are preferably made in this cone to permit the flow of lubricant to its outer surface. A ball cone 14 is threaded on the axle outside of the fixed brake cone. When the brake cone and the ball cone are tightened these parts are locked on the axle.

The sprocket wheel 15 is desirably screwed upon a threaded section of the ball cone 16 and clamped there by the nut 17. This ball cone is held in proper adjustment on the axle by the cone nut 18 which holds the bearing balls 19 in the cup in the outer end of the sprocket cone.

The sprocket cone hub 20 is provided with exterior screw threads 21. These screw threads are engaged with internal threads in the nut or movable clutch member 22. The external surface of this nut is tapered toward both ends. The outer taper 23 is adapted to engage the tapered surface 24 of the inner wall of the wheel hub, while the inner taper 25 is adapted to engage the tapering surface in the end of the sleeve 6. It is desirable to form ratchet teeth 26 on the inner end of the movable clutch member and have this end fit closely within the spring friction ring 12.

When the movable clutch member is moved inward for braking, the teeth on its inner end are engaged with the teeth on the inner end of the fixed brake cone. This prevents the movable clutch member from rotating with the double tapered sleeve, thus providing a double frictional braking contact, that is, when the movable member is forced inward it pushes the sleeve onto the fixed member so that the sleeve makes frictional contact with both the fixed brake cone and the then fixed movable clutch member. The teeth only come in contact on their parallel sides and are cut deep enough to permit braking contact of the parts, even after considerable wear. The spring friction ring, which is placed about the inner end of the fixed brake cone and also closely fits the movable clutch member, causes such friction on the latter that it moves longitudinally back and forth and does not turn with the screw on the sprocket hub. Non-fluid grease is filled in the openings 13 for the purpose of lubricating the parts and this naturally works through the various passages and between the surfaces to prevent their becoming set and also to reduce the wear to a minimum.

When the sprocket wheel is turned forwardly, the screw on the sprocket hub draws the nut or movable clutch member outwardly and causes its outer tapering wall to engage the tapering inner wall of the wheel hub at that end, and so clutch the parts that the wheel will be driven forwardly. If the sprocket wheel is held against rotation, the forward movement of the wheel tends to drag the nut with it. This causes the nut to move inwardly on the threaded sprocket hub, that is held stationary, so as to release the wheel and allow it to run free. When the sprocket wheel is given a backward movement, the threaded hub drives the nut inwardly into the tapering end of the longitudinally movable sleeve, and to force this sleeve onto the fixed brake cone. As the sleeve is splined to the wheel hub, this tends to check and stop the rotation of the wheel. When the sprocket is again turned forward, its screw threaded hub draws the movable cone outwardly and releases the sleeve from the fixed brake cone, freeing the wheel.

There are comparatively few parts in this organization, and these parts are so shaped that they are strong, act efficiently for driving or braking the hub, and yet are contained in a hub of comparatively small size.

The invention claimed is:

1. A wheel hub having a tapering driving-clutch wall in the interior, a sleeve rotarily connected with but longitudinally movable in the hub, said sleeve having outwardly tapering interior walls, an axle, a braking cone held against rotation on the axle, and extending into one end of the sleeve, a threaded sprocket hub, a sprocket mounted on said threaded hub, and a nut engaged by the thread on the sprocket hub, said nut having a tapered external wall at one end that extends into the tapering section of the wheel hub, and having a tapered external wall at the other end that extends into the sleeve.

2. A wheel hub having a tapering driving-clutch wall in the interior, a sleeve rotarily connected with but longitudinally movable in the hub, said sleeve having an outwardly tapering wall at each end, an axle, a braking cone fixed on the axle and extending into one end of the sleeve, a threaded sprocket hub, a sprocket secured to said threaded hub, and a nut engaged by the thread on the sprocket hub, said nut having its outer surface shaped to engage the tapering driving wall of the wheel hub when moved in one direction, and to engage the tapering end of the sleeve, when moved in the opposite direction.

3. A wheel hub having a tapering driving-clutch wall in the interior, a sleeve with tapering interior walls rotarily connected with but longitudinally movable in the hub, an axle, a stationary cone at one end of the axle, said cone extending into one end of the sleeve, a threaded hub movable on the axle near the other end, a sprocket secured to said threaded hub, and a nut engaged by the thread on the sprocket hub, said nut being shaped to engage the interior tapering driving wall of the wheel hub, when moved in one direction, and to engage and force the sleeve longitudinally onto the fixed cone when moved in the opposite direction.

4. A wheel hub having a tapering driving-clutch wall in the interior, a sleeve rotarily connected with but longitudinally movable in the hub, said sleeve having outwardly tapering interior walls, an axle, a braking cone held against rotation on the axle and extending into the sleeve, a ball cone held against rotation on the axle outside of the fixed brake cone, a threaded hub turning on the axle, a sprocket mounted on said threaded hub, and a nut engaged by the thread on the sprocket hub, the exterior wall of said nut being tapered in opposite directions, one end being adapted to engage the tapered inner driving wall of the wheel hub, and the other end being adapted to engage the tapering inner wall at one end of the sleeve.

5. A wheel hub having a tapering driving-clutch wall in the interior, a sleeve rotarily connected with but longitudinally movable in the hub, said sleeve having oppositely tapering interior walls, an axle, a braking cone having lubricant passages, screwed on the axle, said cone extending into one end of the sleeve, a ball cone screwed upon the axle outside of the brake cone, a sprocket having a threaded hub, mounted on the axle, and a nut having oppositely tapering exterior walls, mounted on the threaded sprocket hub, said nut, when moved in one direction by the threads, engaging and making a driving connection with the interior wall of the wheel hub, and when moved in the opposite direction, engaging the sleeve and causing said sleeve to make a braking engagement with the fixed brake cone.

6. A wheel hub having a tapering driving-clutch wall in the interior, a sleeve splined in the hub, said sleeve having an outwardly tapering interior wall at each end, an axle, a braking cone held against rotation on the axle and extending into the sleeve, a sprocket having a threaded hub mounted on the axle, and a nut having oppositely tapering exterior walls, mounted on the threaded sprocket hub, one end of said nut extending into the tapering section of the wheel hub, and the other end extending into the sleeve.

HARRY B. LESTER.

Witnesses:
BURT SPIVEY,
C. W. FLIEDNER.

Copies of this patent may be obtained for five cents each, by addressing the "Commissioner of Patents, Washington, D. C."